United States Patent
Nagaki et al.

(10) Patent No.: US 8,396,362 B2
(45) Date of Patent: Mar. 12, 2013

(54) LIGHT TRANSMITTING AND RECEIVING MODULE, METHOD FOR MANAGING THE SAME, LIGHT TRANSMITTING AND RECEIVING APPARATUS, AND WAVELENGTH-MULTIPLEXING LIGHT TRANSMITTING AND RECEIVING APPARATUS

(75) Inventors: Yuichi Nagaki, Kawasaki (JP); Tsutomu Aiba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 229 days.

(21) Appl. No.: 12/771,161

(22) Filed: Apr. 30, 2010

(65) Prior Publication Data
US 2010/0209113 A1 Aug. 19, 2010

Related U.S. Application Data

(63) Continuation of application No. PCT/JP2007/071647, filed on Nov. 7, 2007.

(51) Int. Cl.
H04B 10/08 (2006.01)
H04B 17/00 (2006.01)
H04B 10/00 (2006.01)

(52) U.S. Cl. ............ 398/25; 398/22; 398/135; 398/136; 398/137; 398/138; 398/139

(58) Field of Classification Search .................. None
See application file for complete search history.

(56) References Cited

U.S. PATENT DOCUMENTS

| 6,031,647 | A * | 2/2000 | Roberts ............................ 398/94 |
| 2004/0105613 | A1* | 6/2004 | Chown ............................ 385/16 |
| 2004/0114925 | A1* | 6/2004 | Berthold et al. ................. 398/45 |
| 2007/0077066 | A1* | 4/2007 | Nakamoto ....................... 398/33 |
| 2007/0230959 | A1 | 10/2007 | Kamioka et al. |

FOREIGN PATENT DOCUMENTS

| EP | 1054524 | 11/2000 |
| JP | 5-48534 | 2/1993 |
| JP | 2000-307519 | 11/2000 |
| JP | 2001-168843 | 6/2001 |
| JP | 2002-190775 | 7/2002 |
| JP | 2004-23295 | 1/2004 |
| JP | 2005-269194 | 9/2005 |

OTHER PUBLICATIONS

English language International Search Report mailed Jan. 29, 2008 for corresponding International Application No. PCT/JP2007/071647.
Form PCT/ISA/237 from International Application PCT/JP2007/071647.

(Continued)

Primary Examiner — Kenneth N Vanderpuye
Assistant Examiner — Darren E Wolf
(74) Attorney, Agent, or Firm — Staas & Halsey LLP

(57) ABSTRACT

The light transmitting and receiving module includes a light outputting section; a light receiver which receives input light and which outputs an electric signal having an intensity corresponding to a light intensity of the input light; a first variably attenuation controller which variably attenuates the light output from the light outputting section; a second variably attenuation controller which variably attenuates the input light to the light receiver; a first switch which selectively switches a path through which the light from the first variably attenuation controller is output between a light transmitting path and an alternative path different from the light transmitting path; and a second switch which selectively switches light to be output to the second variably attenuation controller between light from an external entity and the light through the alternative path of the first switch.

5 Claims, 9 Drawing Sheets

OTHER PUBLICATIONS

Japanese Patent Office Notification of Reasons for Refusal mailed Sep. 27, 2011, for corresponding Japanese Patent Application No. 2009-539907.

Form PCT/ISA/210, International Search Report mailed Jan. 29, 2008, for corresponding International Application No. PCT/JP2007/071647.

* cited by examiner

LIGHT TRANSMITTING AND RECEIVING MODULE, METHOD FOR MANAGING THE SAME, LIGHT TRANSMITTING AND RECEIVING APPARATUS, AND WAVELENGTH-MULTIPLEXING LIGHT TRANSMITTING AND RECEIVING APPARATUS

CROSS REFERENCE TO RELATED APPLICATION

This application is a continuation Application of a PCT international application No. PCT/JP2007/071647 filed on Nov. 7, 2007 in Japan, the entire contents of which are incorporated by reference.

FIELD

The embodiments discussed herein are related to a light transmitting and receiving module, a method for managing the light transmitting and receiving module, a light transmitting and receiving apparatus, and wavelength-multiplexing light transmitting and receiving apparatus which are preferably used in the field of light communication systems.

BACKGROUND

A light transmitting and receiving module transmits and receives light signals of a single channel (single wavelength) in, for example, a wavelength-multiplexing (WDM) light communication system. FIG. 6 illustrates an example of a WDM light communication system having a light transmitting and receiving module used in a WDM transmission apparatus. A WDM light communication system 100 illustrated in FIG. 6 is coupled to an opposing WDM transmission apparatus 103 via a WDM transmission path 101 and a light amplifier/relay apparatus 102.

A WDM transmission apparatus 103 transmits and receives a WDM light in which signal lights of respective channels (wavelengths λ1~λn) are wavelength multiplexed, and includes light transmitting and receiving sections 112-1 through 112-n which are dedicated one to each channel and each of which includes two transmitting and receiving modules 111 serving as a duplex component, redundancy multiplexing/demultiplexing sections 113-1 through 113-n which are dedicated one to each channel, a light multiplexing/demultiplexing section 114 which multiplexes signals of respective channels into WDM light and which demultiplexes WDM light into signals of respective channels, and a light amplifier 115.

Individual transmitting and receiving modules 111 included in each light transmitting and receiving section 112 have respective light transmitting and receiving circuits 116 each of which includes, besides the configuration of transmitting signal light, photodiode which receives signal light received in the transmitting and receiving module 111, and respective switches 117 that switches between the working transmitting and receiving module 111 and the protection transmitting and receiving module 111. Namely, respective light transmitting and receiving circuits 116 in transmitting and receiving modules 111 serving as a duplex component output transmitting signal light. The switch 117 of the transmitting and receiving module 111 set to be the working module outputs a transmitting signal light from the light transmitting and receiving circuit 116 to the downstream redundancy multiplexing/demultiplexing section 113 (switch on) while the switch 117 of the transmitting and receiving module 111 set to be the protection module disconnects a light path to the redundancy multiplexing/demultiplexing section 113 (switch off). A receiving signal light is received in respective light transmitting and receiving circuits 116 of the transmitting and receiving modules 111 serving as a duplex component and converted into electrical signals one of which is selected as a received electric signal.

Here, the working transmitting and receiving module 111 appropriately variably attenuates transmitting signal light that is to be output from the light transmitting and receiving circuit 116 such that the light levels of respective channels serving as WDM light after being amplified in the light amplifier 115 are equalized. In addition, the transmitting and receiving module 111 appropriately variably attenuates receiving signal light which includes lights of respective channels and whish is transmitted through the WDM transmission path 101 such that the photodiodes of the transmitting and receiving modules 111 can receive the lights at appropriate reception levels.

The working transmitting and receiving module 111 adjusts levels of receiving signal light and transmitting signal light through the use of non-illustrated variable optical attenuators (VOAs). A VOA is generally controlled to have a larger amount of attenuation in accordance with increase in a controlling electric signal (e.g., a current signal) and has an amount "0" of attenuation when no electric signal is supplied to the VOA. There is a large variation in relationship between the largeness of a controlling electric signal and the largeness of an amount of attenuation among individual VOAs as illustrated in FIG. 7. Accordingly, the respective VOAs included in the duplexed transmitting and receiving modules 111 do not always have the same relationship between the largeness of a controlling electric signal and the largeness of an amount of attenuation.

For the above, each transmitting and receiving module 111 includes a variable optical attenuator (VOA) interposed between the light transmitting and receiving circuit 116 and the light switch 117, and carries out feedback control based on output light power from the VOA such that the amount of attenuation corresponding to the controlling electric signal is stably in a desired level. Furthermore, in order to variably attenuate receiving signal light to a desired level, a VOA is disposed on a light path upstream of the transmitting and receiving module 111, so that feedback control is carried out on the amount of attenuation in the VOA on the basis of electric signal received by and then output from the photodiode of the transmitting and receiving module 111.

The configuration in which the switch 117 of the transmitting and receiving modules 111 switches between the working module and the protection module requires only light couplers 113a and 113b, functioning as passive devices to arrange the light path to and from respective transmitting and receiving modules 111 for the redundancy multiplexing/demultiplexing section 113, so that a failure rate of the redundancy multiplexing/demultiplexing section 113 is reduced. Incorporation of active devices, such as laser diodes, having relatively high failure rate into the light transmitting and receiving sections 112 makes it possible to replace such active device without affecting the other channels being working.

Besides, the Patent Literature 1 is listed as a technique related to the present invention.
[Patent Literature 1] Japanese Patent Publication No. 2004-23295

However, since no receiving signal light is input into a transmitting and receiving module 111 which is installed but is for a channel not being used, the functional part to control an amount of attenuation of the VOA of the transmitting and receiving module 111 does not obtain the relationship between a controlling electric signal and an amount of attenuation of the VOA to be controlled even through the above feedback control. As a consequence, under the circumstance where no received signal is input, it is difficult to stably control the VOA to have a desired amount of attenuation.

In this case, for example, assuming that an unused transmitting and receiving module 111 comes into a state of being used or that the light transmitting and receiving section 112 is replaced with another section, the relationship between the largeness of a controlling electric signal and an amount of attenuation of the VOA to be controlled is not grasped at the start of using. For this reason, it may be difficult to cause the photodiode of the light transmitting and receiving circuit 116 to obtain light in an appropriate reception range at the start of receiving signal light.

As an example, the light transmitting and receiving section 112 is assumed to have the transmitting and receiving modules 111 which function as a duplex component and which include variable optical attenuators 121 and 122, as illustrated in FIG. 8. The light transmitting and receiving section 112 of FIG. 8 includes variable optical attenuators (VOA1, VOA3) each of which is interposed between the light transmitting and receiving circuit 116 and the optical switch 117 of one of the transmitting and receiving modules 111, so that transmitting signal light is variably attenuated. Furthermore, the light transmitting and receiving section 112 includes variable optical attenuators (VOA2, VOA4) each of which is included in one of the transmitting and receiving modules 111, so that receiving signal lights to be input into the transmitting and receiving modules 111 are variably attenuated. It should be noted that the variable optical attenuators 121 and 122 have different relationships between a controlling electric signal and an amount of attenuation as described above.

A VOA controller 125 that controls the variable optical attenuator 121 as illustrated in FIG. 8 obtains, from light coupler 123 and light monitors (PD1 and PD3) 124, power information of transmitting signal light that is to be output from the variable optical attenuator 121, and carries out feedback control on the amount of attenuation for the variable optical attenuator 121 corresponding to the controlling electric signal to the variable optical attenuator 121 on the basis of the output light power from the variable optical attenuator 121.

A VOA controller 127 that controls the variable optical attenuator 122 obtains, from photodiodes (PD2 and PD4) 116a of the light transmitting and receiving circuit 116, power information of receiving signal light that is to be output from the variable optical attenuator 122 and carries out feedback control on the amount of attenuation for the variable optical attenuator 122 corresponding to the controlling electric signal to the variable optical attenuator 122 on the basis of the output light power from the variable optical attenuator 122, so that the light level of the receiving signal light to be input into the photodiode 116a is stabilized.

However, when the light transmitting and receiving section 112 of FIG. 8 comes into a state of being used from the unused state or restarts the operation after replacement of parts, the light transmitting and receiving section 112 does not receive receiving signal light as illustrated in FIG. 9. Therefore, the VOA controller 127 does not grasp (has not retrieved) the relationship of the variable optical attenuator 122 to be controlled between the amount of attenuation and the controlling electric signal so that it may be difficult for the photodiode in the light transmitting and receiving circuit 116 to attenuate receiving signal light to have a receiving level in a proper range at the start of inputting receiving signal light.

SUMMARY (1) According to an aspect of the embodiments, an apparatus includes a light transmitting and receiving module including: a light outputting section which outputs light; a light receiver which receives input light and outputs an electric signal having an intensity corresponding to a light intensity of the input light; a first variably attenuation controller which variably attenuates the light output from the light outputting section; a second variably attenuation controller which variably attenuates the input light that is to be input into the light receiver; a first switch which selectively switches a path through which the light from the first variably attenuation controller is output between a light transmitting path and an alternative path different from the light transmitting path; and a second switch which selectively switches light to be output to the second variably attenuation controller between light from an external entity and the light through the alternative path of the first switch.

(2) According to an aspect of the embodiments, an apparatus includes a light transmitting and receiving apparatus including: a plurality of light transmitting and receiving modules defined in (1); and a controller which controls the plurality of light transmitting and receiving modules such that one of the plurality of light transmitting and receiving modules functions as a working module and the remaining modules functions as protection modules.

(3) According to an aspect of the embodiments, an apparatus includes a wavelength-multiplexing light transmitting and receiving apparatus including a plurality of light transmitting and receiving apparatuses defined in (2) dedicated one to each wavelength of light to be transmitted and received.

(4) According to an aspect of the embodiments, a method includes a method for controlling and managing variable attenuation of a first attenuator and a second attenuator which are included in a light transmitting and receiving module including a light outputting section which outputs light, a light receiver which receives input light and outputs an electric signal having an intensity corresponding to a light intensity of the input light, the first variably attenuation controller which variably attenuates the light output from the light outputting section, using a first controlling signal, and the second variably attenuation controller which variably attenuates the input light that is to be input into the light receiver, using a second controlling signal, includes: when starting-up of the light transmitting and receiving module, outputting light from the first attenuator for which an amount of attenuation is set to be fixed to the second attenuator for which an amount of attenuation is set to be an arbitrary value through an alternative path different from a light transmitting path, at a second attenuator controller which controls the second attenuator, managing a relationship between the second controlling signal for the second attenuator and an amount of attenuation for the second attenuator on the basis of the result of receiving, at the light receiver, light output from the second attenuator; outputting light from the first attenuator for which an amount of attenuation is set to be an arbitrary value to the second attenuator for which an amount of attenuation is set to be fixed through the alternative path different from the light transmitting path; and at a first attenuator controller which controls the first attenuator, managing a relationship between the first controlling signal for the first attenuator and an amount of attenuation for the first attenuator on the basis of the result of receiving, at the light receiver, light output from the second attenuator.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Hereinafter, embodiments will be described with reference to the drawings. Note that the embodiments are not limited to the embodiments to be described below, but may be modified in various ways without departing from sprits and scope of the embodiments, as a matter of course.

(A) An Embodiment

Figure 1:
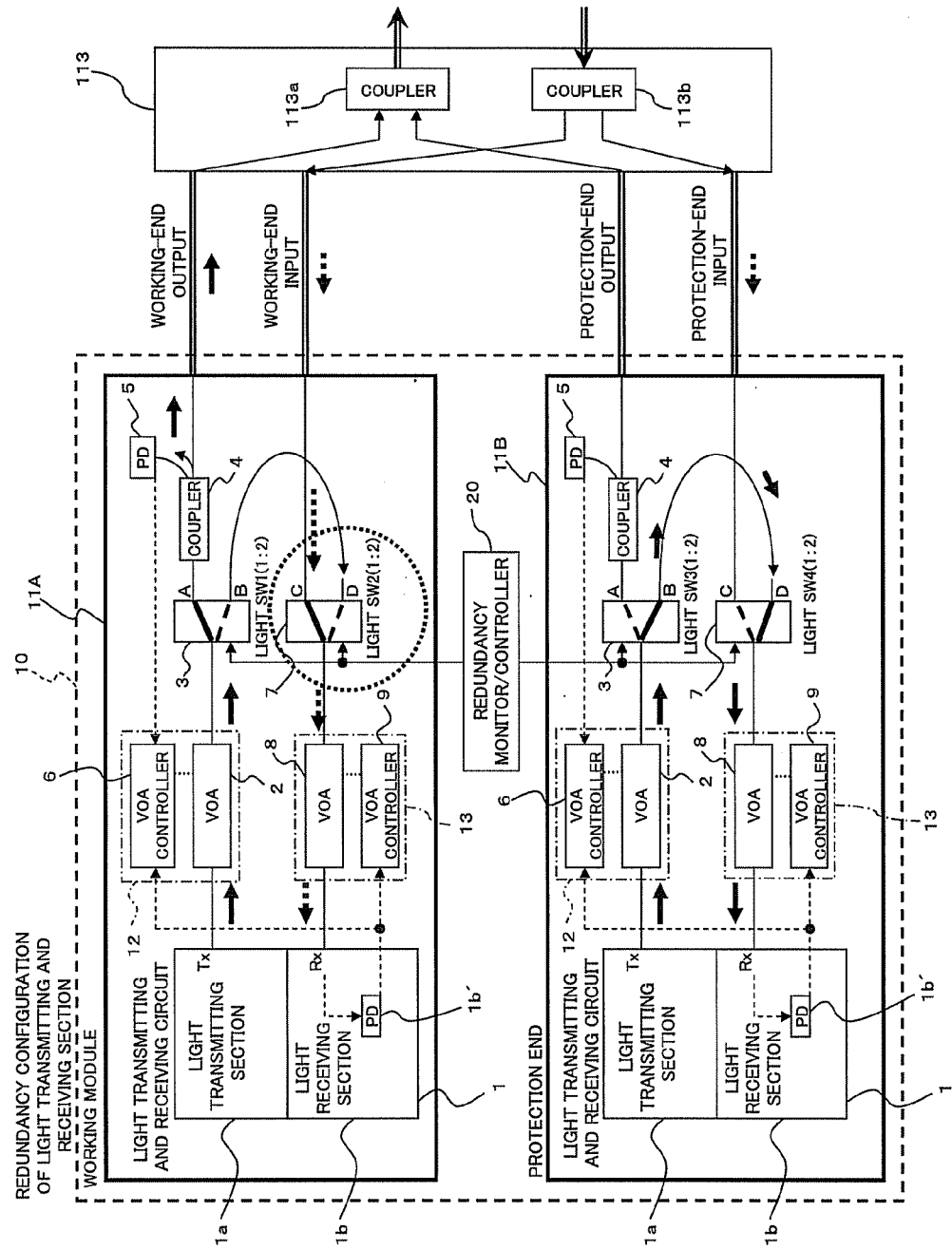
FIG. 1 is a diagram illustrating a light transmitting and receiving apparatus according to a first embodiment.
Figure 6:
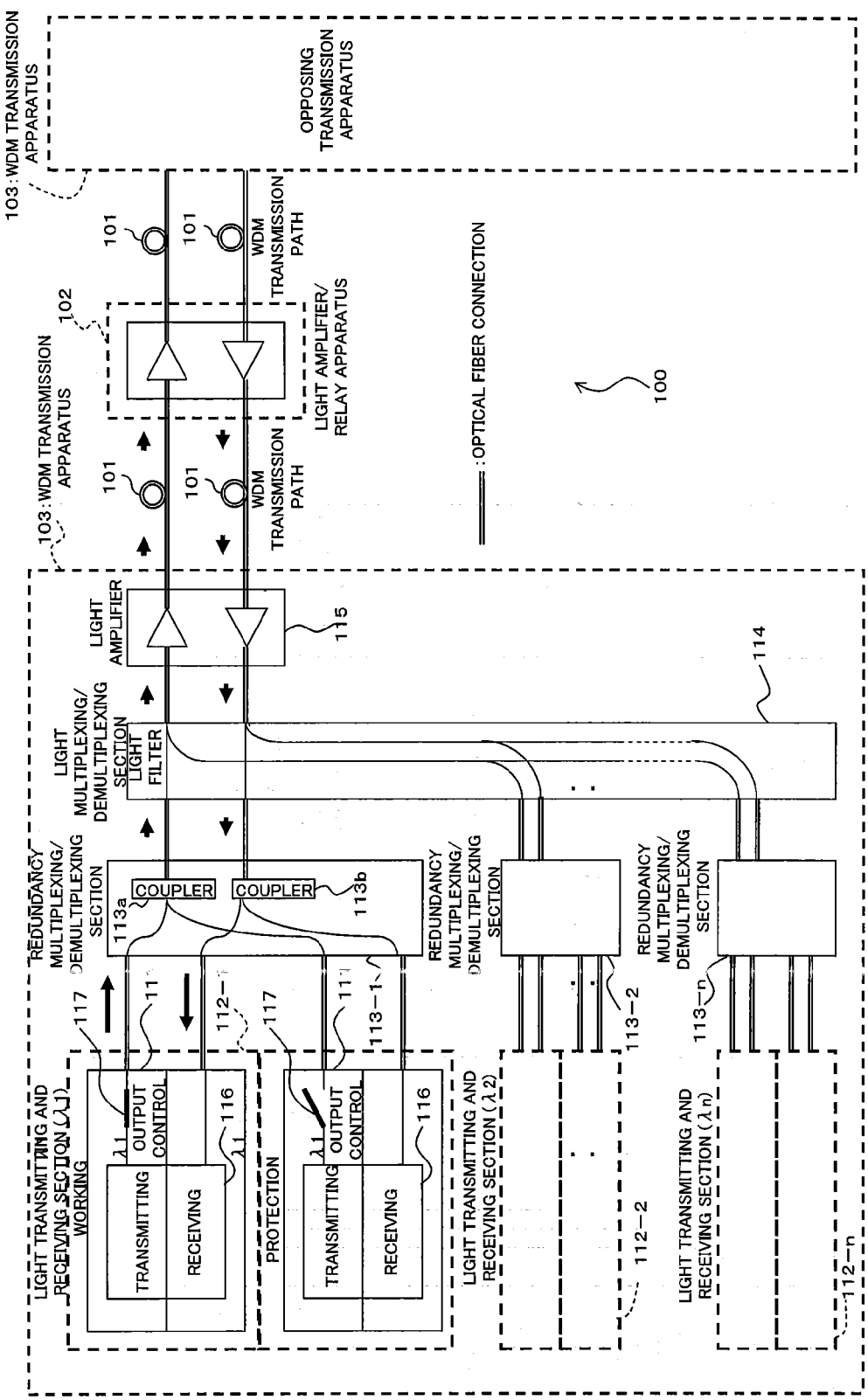
FIG. 6 is a diagram illustrating a technique related to the embodiment.
Figure 7:
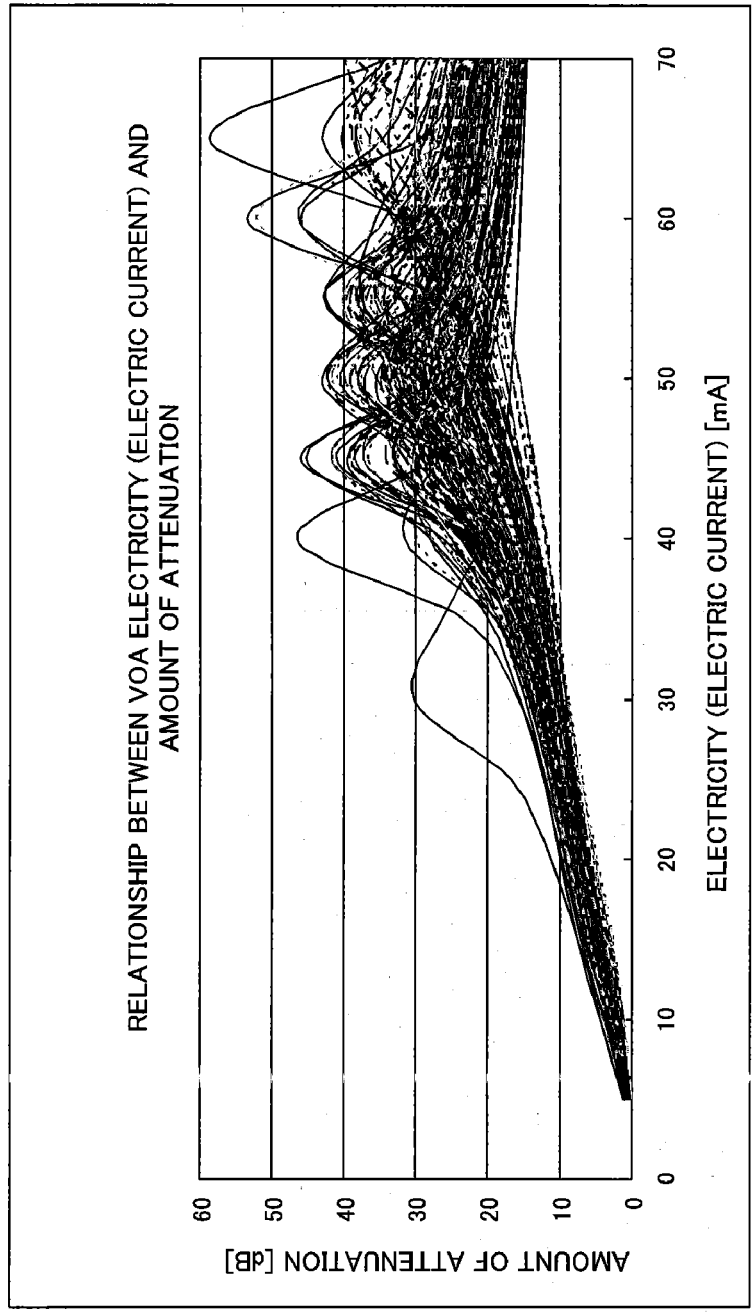
FIG. 7 is a diagram illustrating a technique related to the embodiment.

FIG. 1 is a diagram illustrating a light transmitting and receiving apparatus according to an embodiment of the present invention. The light transmitting and receiving apparatus 10 of FIG. 1 can be used as the light transmitting and receiving section (see reference number 112) dedicated to each WDM channel in the WDM transmission apparatus (wavelength multiplexing transmission apparatus) 103 illustrated in FIG. 6, for example. In other words, the light transmitting and receiving apparatus 10 can function as a wavelength multiplexing transmitting and receiving apparatus in conjunction with elements represented by reference number 113 through 115 in FIG. 6. Reference numbers (113, 113a, and 113b) in FIG. 1 the same as those in FIGS. 6 and 8 represent similar and substantially similar elements and parts as those of FIGS. 6 and 8.

Figure 8:
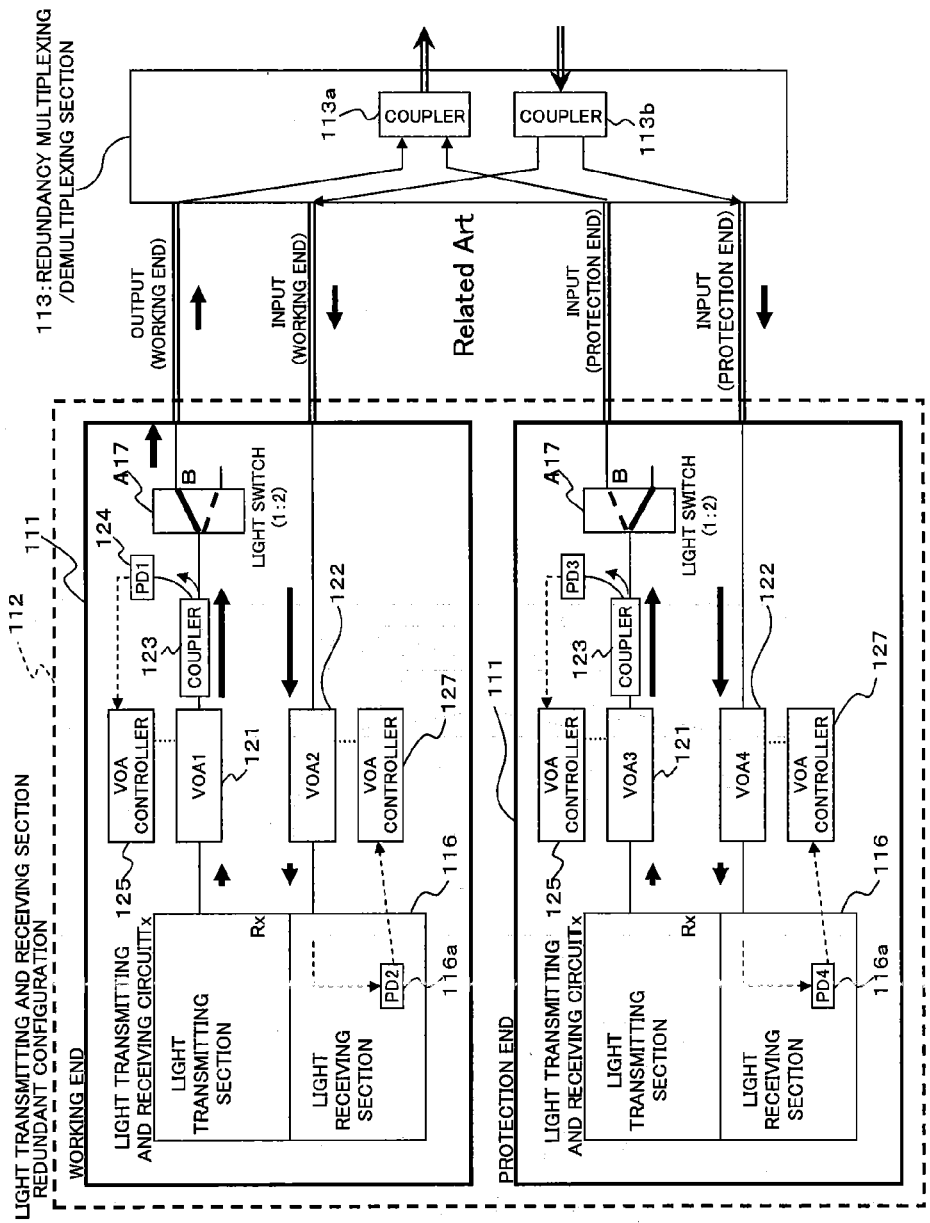
FIG. 8 is a diagram illustrating a technique related to the embodiment.
Figure 9:
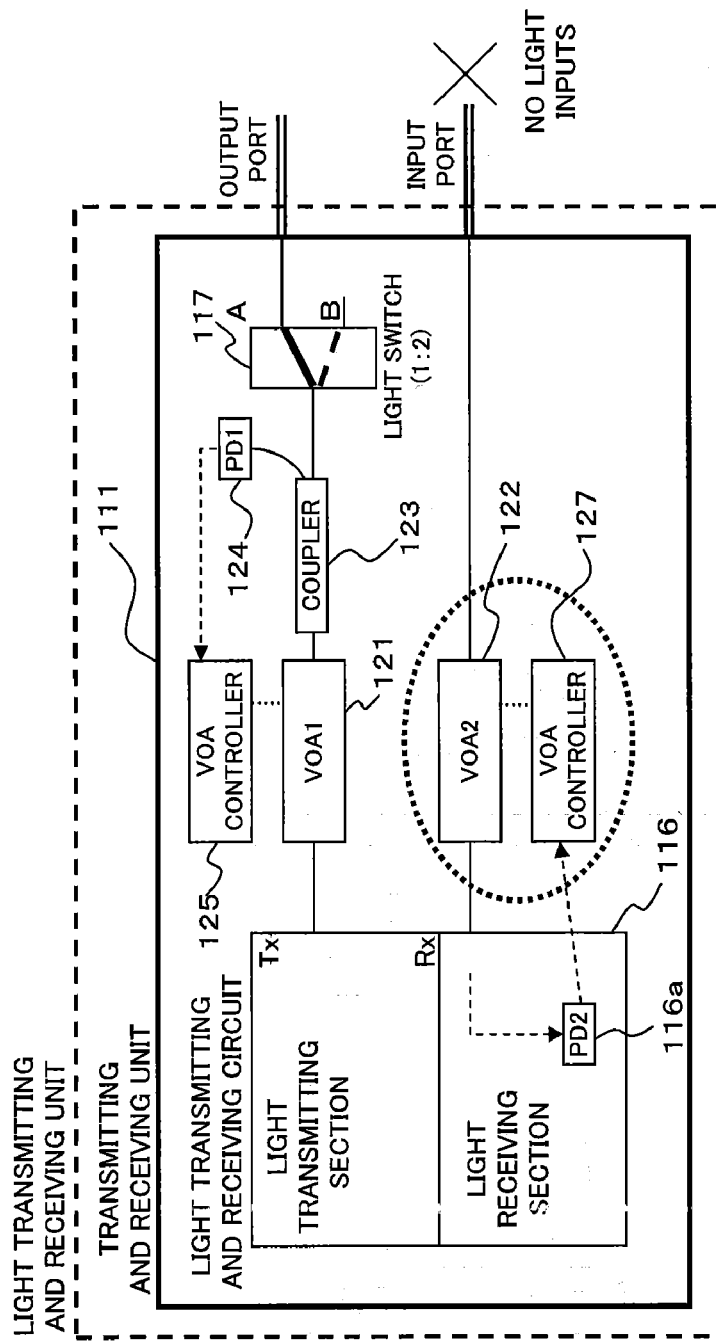
FIG. 9 is a diagram illustrating a technique related to the embodiment.

Here, similarly to the light transmitting and receiving apparatus illustrated in FIG. 8, the light transmitting and receiving apparatus 10 of the embodiment includes transmitting and receiving modules 11A and 11B, having the same configuration and serving as a duplex component. Under the control of a redundancy monitor/controller 20, one of the transmitting and receiving modules 11A and 11B is used as the working module and the other is used as the protection module. Each of the transmitting and receiving modules 11A and 11B includes a light transmitting and receiving circuit 1, a variable optical attenuator (VOA) 2, a light switch (light SW) 3, a coupler 4, a light monitor (PD) 5, a VOA controller 6, a light switch (light SW) 7, a variable optical attenuator (VOA) 8, and a VOA controller 9. Hereinafter, the following description is made commonly to the transmitting and receiving modules 11A and 11B unless otherwise specified.

The light transmitting and receiving circuit 1 includes a light transmitting section (light outputting section) 1a that outputs transmitting signal light (Tx) and a photodiode (light receiving section, PD) 1b' that receives receiving signal light (Rx) input through the redundancy multiplexing/demultiplexing section 113 and outputs an electric signal.

The variable optical attenuator (VOA) 2 functions as a first attenuator that attenuates transmitting signal light to be output from the light transmitting section 1a by a variable amount of attenuation. The VOA controller 6 functions as a first attenuator controller that controls the amount of attenuation of the variable optical attenuator 2 by outputting a first controlling signal to the variable optical attenuator 2. Thereby, for example, under the control of the VOA controller 6, a target amount of attenuation is determined for the variable optical attenuator 2 such that the level of transmitting signal light from the corresponding light transmitting and receiving module 11A is equalized with levels of transmitting signal light of other channels, and the transmitting signal light can be variably attenuated. Accordingly, the variable optical attenuator 2 and the VOA controller 6 function as a first variable attenuation controller 12 that controls variable attenuation on light output from the light transmitting section 1a in cooperation with each other.

The variable optical attenuator (VOA) 8 functions as a second attenuator that attenuates light to be input into the photodiode 1b' serving as the light receiving section 1b by a variable amount of attenuation. Further, the VOA controller 9 functions as a second attenuator controller that controls the amount of attenuation for the variable optical attenuator 8 by outputting a second controlling signal to the variable optical attenuator 8. Thereby, for example, the level of light to be received by the photodiode 1b' can be adjusted to a proper reception level. Accordingly, the variable optical attenuator 8 and the VOA controller 9 function as a second variable attenuation controller 13 that controls variable attenuation on light to be input into the photodiode 1b' in cooperation with each other.

Furthermore, the light switch (first switch) 3 is a one-input two-output light switch that selectively switches between a light transmitting path (A) and an alternative path (B) different from the light transmitting path (A) for transmitting signal light output from the variable optical attenuator 2.

The light switch (second switch) 7 functions as a second switch that selectively switches between light from an external entity and light from the alternative path (B) of the above light switch 3 and outputs the selected light to the variable optical attenuator 8. Specifically, the light switch 7 includes an input path (C) which is coupled to the redundancy multiplexing/demultiplexing section 113 and through which light from an external entity is introduced, and an input path (D) which is coupled to the alternative path (B) of the light switch 3. The light switch 7 selectively switches between the light from the input paths (C and D) and outputs the selected light to the variable optical attenuator 8.

The redundancy monitor/controller 20 controls switching of the light switches 3 and 7 in the transmitting and receiving modules 11A and 11B and thereby switches states of working/protection of the transmitting and receiving modules 11A and 11B. Accordingly, the redundancy monitor/controller 20 functions as a controller that controls the individual transmitting and receiving modules 11A and 11B such that one of the modules functions as the working module while the other functions as the protection module.

Here, the working light transmitting and receiving module (11A in FIG. 1) causes the light switch 3 to select the light transmission path (A) and causes the light switch 7 to select the input path (C) coupled to the redundancy multiplexing/demultiplexing section 113 under the control of the redundancy monitor/controller 20. The protection light transmitting and receiving module (11B in FIG. 1) causes the light switch 3 to select the alternative path (B) and causes the light switch 7 to select the input path (C) coupled to the alternative path (B) of the light switch 3.

Accordingly, the redundancy monitor/controller 20 serves as a switch controller that controls switching of the light switches 3 and 7. The switching control switches operation modes of the respective light transmitting and receiving modules 11A and 11B such that each module operates in either the working mode or the protection mode. Here, operation in the working mode at least causes the light switch 7 to output light from an external entity to the variable optical attenuator 8 and, further in the first embodiment, causes the light switch 3 to output transmitting signal light from the light transmitting section 1a to the redundancy multiplexing/demultiplexing section 113.

In contrast, operation in the protection mode carries out switching control that causes the light switch 3 to output light from the variable optical attenuator 2 through the alternative path (B) and causes the light switch 7 to output light from the alternative path (B) of the light switch 3 to the photodiode 1b' through the variable optical attenuator 8.

Referring to FIG. 1, setting the light transmitting and receiving module 11A to be the working module, transmitting signal light and receiving signal light are communicated between the light transmitting and receiving module 11A and the redundancy multiplexing/demultiplexing section 113. In the meantime, the light transmitting and receiving module 11B, which is set to be the protection module, causes the photodiode 1b' of the light receiving section 1b to receive transmitting signal light output from the light transmitting section 1a of the light transmitting and receiving circuit 1 through the variable optical attenuator 2, the light switches 3 and 7, and the variable optical attenuator 8 to be detailed below. In other words, the photodiode 1b' serving as a light receiving section receives light from the light transmitting section 1a through the switching of the light switches 3 and 7 and outputs the equivalent electric signal.

The coupler 4 bifurcates transmitting signal light output from the light switch 3 through the light transmitting path, outputs one of the two components, as the transmitting signal light, to the redundancy multiplexing/demultiplexing section 113 and outputs the other component to the light monitor 5. The light monitor 5 monitors the light power of the transmitting signal light bifurcated by the coupler 4 and outputs an electric signal having an intensity corresponding to the monitored light power to the VOA controller 6.

With this configuration, as illustrated in FIG. 1, for example, the VOA controller 6 of the working light transmitting/receiving module (here, 11A) can control the amount of attenuation for the variable optical attenuator 2 on the basis of the result of monitoring on the light power of transmitting signal light input into the light monitor 5 via the light switch 3 and the coupler 4, and consequently can adjust the level of the transmitting signal light. Here, the VOA controller 9 can control the amount of attenuation for the variable optical attenuator 8 on the basis of the monitoring signal obtained as the result of monitoring on receiving signal light input through the light switch 7 at the photodiode 1b'.

Furthermore, the VOA controller 6 of the protection light transmitting and receiving module (here, 11B) can control the VOA 2 by receiving the result of monitoring by the photodiode 1b' on light (transmitting signal light) from the light transmitting section 1a via the optical switches 3 and 7, and can retain a relationship between the controlling electric signal and the amount of light attenuation for the VOA 2 during a stand-by state. Similarly, the VOA controller 9 of the protection light transmitting and receiving module 11B can control variable optical attenuator 8 by receiving the result of monitoring by the photodiode 1b' on light from the light transmitting section 1a through the light switches 3 and 7, and thereby can retain a relationship between the controlling electric signal and the amount of light attenuation for the variable optical attenuator 8 during a stand-by state in which no receiving signal light is input.

Accordingly, when the light switch 3 outputs light from the variable optical attenuator 2 through the light transmitting path A, the VOA controller 6, serving as the first attenuator controller, controls the amount of attenuation for the variable optical attenuator 2 on the basis of the monitoring results by the light monitor 5. On the other hand, when the photodiode 1b' receives light from the light transmitting section 1a and outputs an equivalent electric signal in response to the switching of the light switch 3 to the alternative path B and switching of the light switch 7, the VOA controllers 6 and 9 can control amounts of attenuation for the variable optical attenuators 2 and 8, respectively, on the basis of the electric signal from the photodiode 1b'.

Description will now be made in relation to operation of the light transmitting and receiving apparatus 1 having the above configuration, particularly focusing on operation of the transmitting and receiving module 11A, with reference to FIGS. 2 through 5.

First of all, in starting up the light transmitting and receiving apparatus 10, for example, in increasing of a channel that the light transmitting and receiving apparatus 10 assumed to be applied to the WDM transmission apparatus of FIG. 6, the working transmitting and receiving module (for example, 11A) detects the value (e.g. electricity) of the controlling electric signal which makes the amount of attenuation for the variable optical attenuator 2 maximum. The remaining transmitting and receiving module serving as the protection module detects the value of the controlling electric signal in the same manner.

Figure 2:
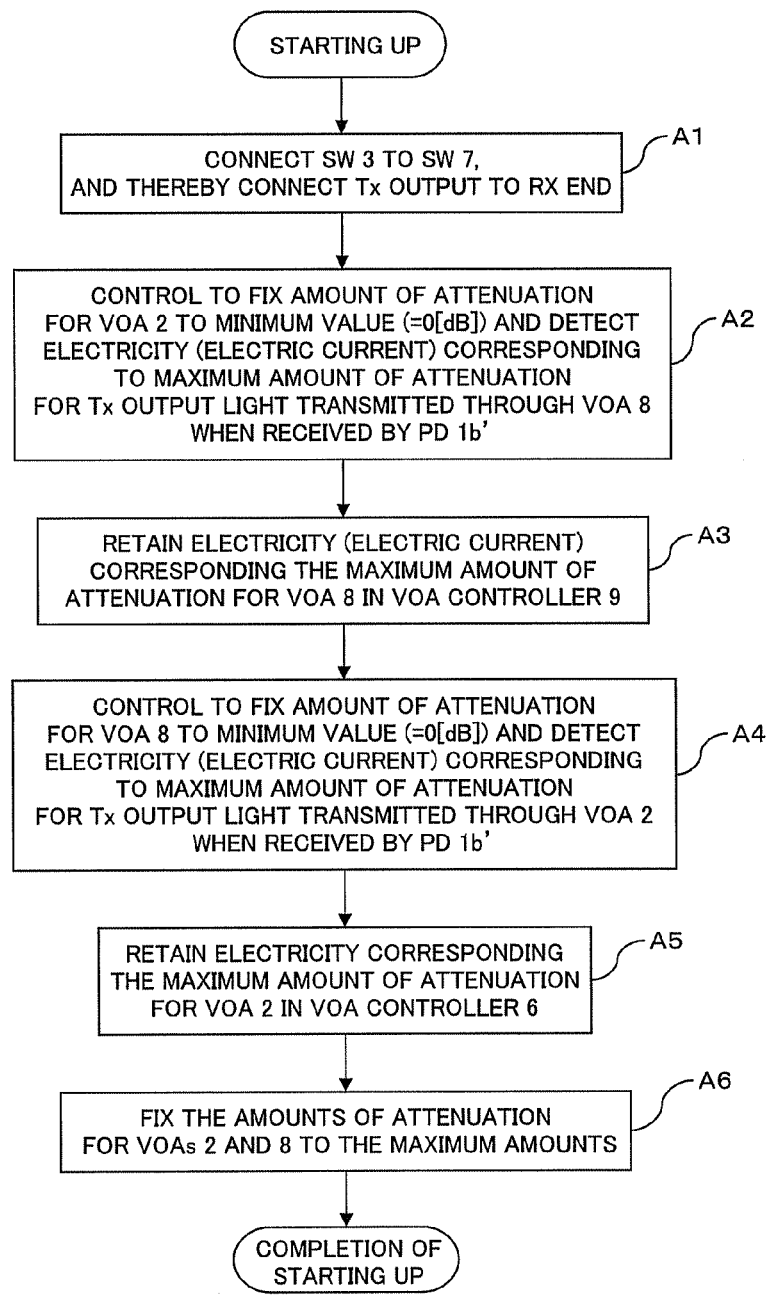
FIG. 2 is a flow diagram illustrating operation of the embodiment.
Figure 3:
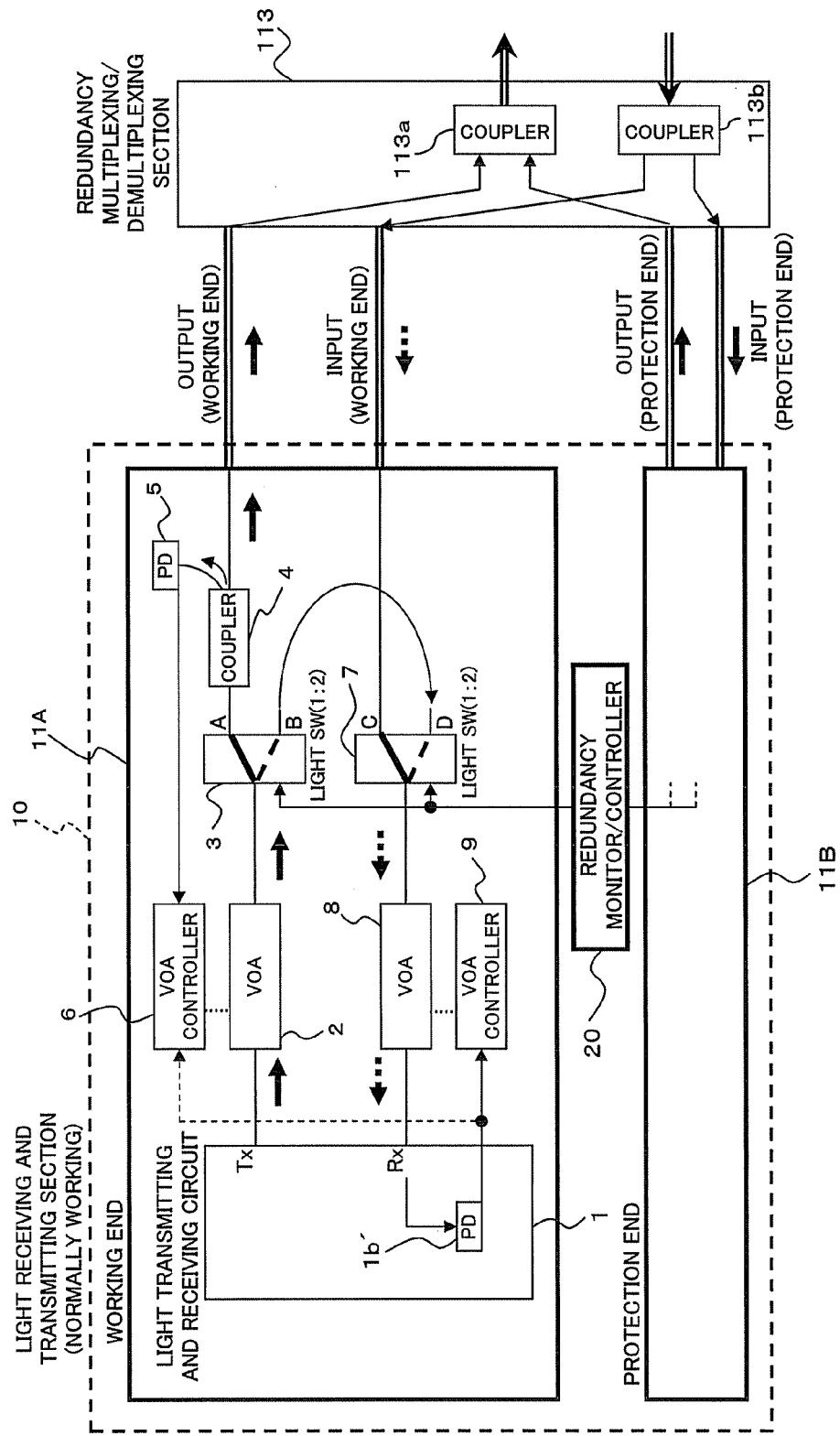
FIG. 3 is a diagram illustrating operation of the embodiment.

For example, as illustrated in FIG. 3, under the control of the redundancy monitor/controller 20, the output path B of the light switch 3 in the transmitting and receiving module 11A is coupled to the input path D of the light switch 7, so that light output from the light transmitting section 1a is connected to the light receiving section 1b, that is light output from the light transmitting section 1a is input into the light receiving section 1b (step A1 in FIG. 2).

Then, the controlling electric signal (current signal) from the VOA controller 6 is set to be "0", so that the amount of attenuation for the variable optical attenuator 2 is fixed to the minimum value (=0[dB]). Concurrently, the photodiode 1b' receives light which is output from light transmitting section 1a and propagates through the variable optical attenuator 2, and outputs an electric signal (monitoring signal) corresponding to the intensity of the received light to the VOA controller 9. The intensity of light output from the light transmitting section 1a is rated with the intention that the photodiode 1b' can safely receive the light.

The VOA controller 9 varies the amount of attenuation for the variable optical attenuator 8 by varying the controlling signal for the variable optical attenuator 8 on the basis of the monitoring signal output from the photodiode 1b' and thereby detects the electricity value (controlling electric signal)

which makes the amount of attenuation for the variable optical attenuator 8 maximum (step A2). The detected current value is retained in the VOA controller 9 (step A3).

Next, the controlling electric signal (current signal) from the VOA controller 9 is set to be "0" to fix the amount of attenuation for the variable optical attenuator 8 to be the minimum value (=0 [dB]). Concurrently, the photodiode 1b' receives light which is output from the light transmitting section 1a and propagates through the variable optical attenuator 2, and outputs an current signal (monitoring signal) corresponding to the intensity of the received light to the VOA controller 6. The VOA controller 6 detects the electricity value (controlling electric signal) which makes the amount of attenuation for the variable optical attenuator 2 maximum (step A4) by varying the controlling electric signal for the variable optical attenuator 2 on the basis of the monitoring signal output from the photodiode 1b' to vary the amount of attenuation. The current value thus detected is retained in the VOA controller 6 (step A5).

Upon completion of detection of controlling electric signals which make the amounts of attenuation for the variable optical attenuators 2 and 8 maximum, the VOA controllers 6 and 9 fix the amounts of attenuation for the variable optical attenuators 2 and 8 to the maximum values to complete operation of starting up of the transmitting and receiving module 11A (step A6).

Next, description will now be made in relation to an example of normal working operation after the above start-up operation is completed. Specifically, upon completion of the above start-up operation, the control of the redundancy monitor/controller 20 causes signal light to propagate between the working transmitting and receiving module and the redundancy multiplexing/demultiplexing section 113, and decreases the amounts of attenuation for the VOAs 2 and 8 to amounts corresponding to the target light levels.

Figure 4A:
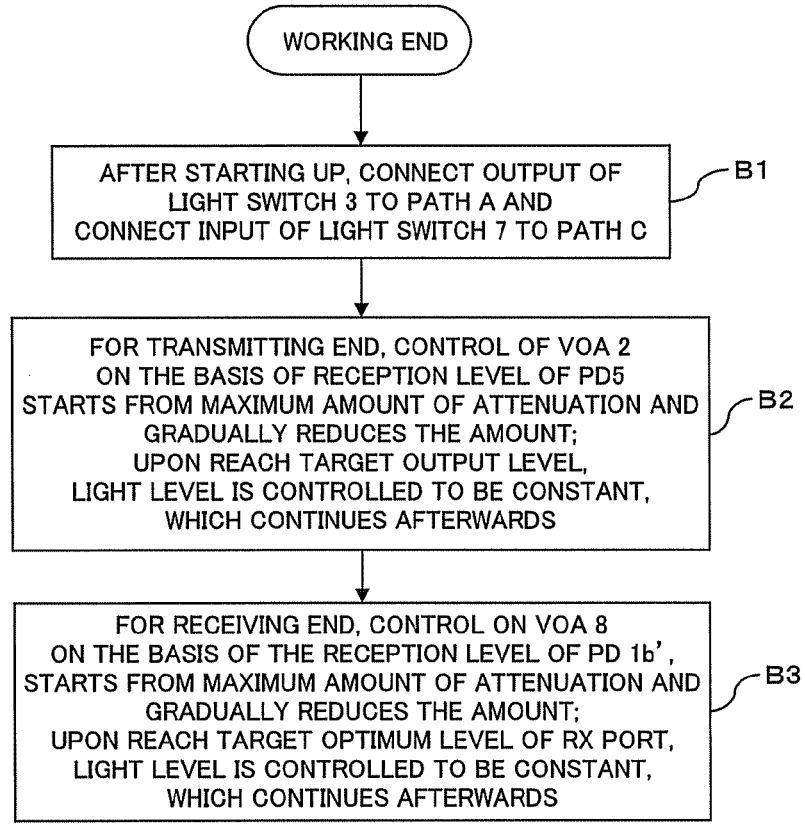
FIGS. 4A and 4B are flow diagrams illustrating operation of the embodiment.
Figure 5:
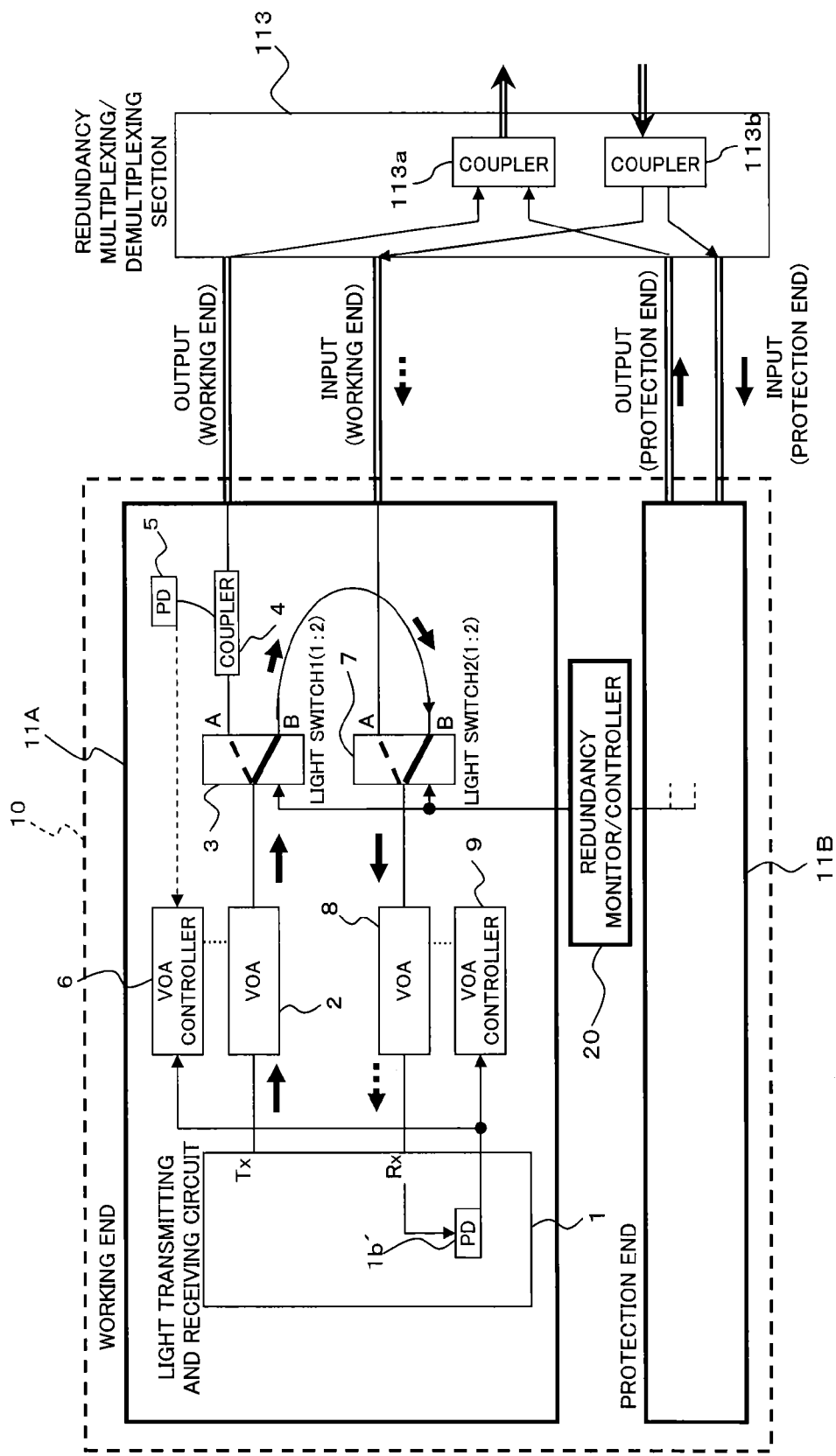
FIG. 5 is a diagram illustrating operation of the embodiment.

In detail, as illustrated in FIG. 5, for example, the output of the light switch 3 and the input of the light switch 7 of the working transmitting and receiving module (11A in FIG. 5) are switched to the output path A and the input path C, respectively (step B1 in FIG. 4A). Subsequently, the transmitting-end VOA controller 6 controls the amount of attenuation for the variable optical attenuator 2 on the basis of the monitoring signal corresponding to the reception level of the light monitor 5 by starting the control at the maximum amount and gradually decreasing the amount of attenuation. When an output of the variable optical attenuator 2 becomes the target output level, the control by the VOA controller 6 shifts to control at a constant light level, which continues afterwards (step B2).

In contrast, the receiving-end VOA controller 9 controls the amount of attenuation for the variable optical attenuator 8 on the basis of the monitoring signal corresponding to the light reception level at the photodiode 1b' by starting the control at the maximum amount of attenuation and gradually decreasing its amount. When an output of the variable optical attenuator 8 becomes the optimum reception level, at the light receiving section 1b (Rx port), i.e., the target level, the control by the VOA controller 9 shifts to control at a constant light level, which continues afterwards (step B3).

Figure 4B:
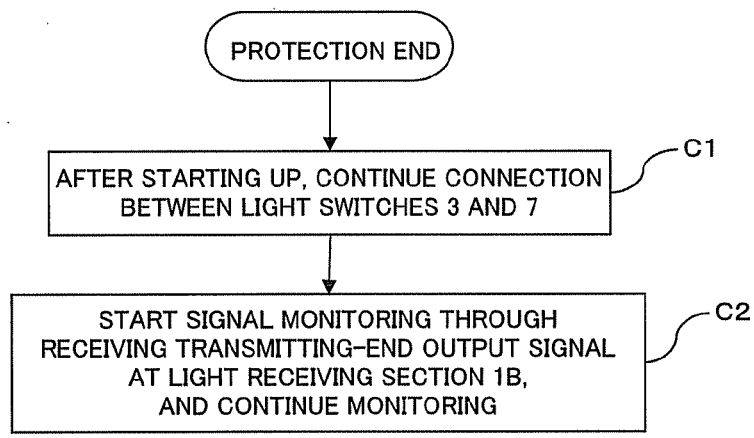

Upon completion of the above start-up operation, the protection light transmitting and receiving module (11B in FIG. 5) couples the output path B of the light switch 3 to the input path D of the light switch 7 under the control of the redundancy monitor/controller 20 (step C1 in FIG. 4B). The protection light transmitting and receiving module starts signal monitoring by causing the light receiving section 1b to receive the output signal light from the light transmitting section 1a, controlling the variable optical attenuators 2 and 8 at the maximum amounts of attenuation, and continues the monitoring (step C2). Information of the result of the monitoring can be output to the redundancy monitor/controller 20.

As the above description, the light switches 3 and 7 allows the first embodiment to control the amount of attenuation for a variable optical attenuator for receiving signal light even when receiving signal light is not input. Consequently, that brings an advantage of always stabilizing the input level of receiving signal light in a proper range.

(b) Others:

Besides the foregoing first embodiment, the present invention can be variously carried out.

In addition, those ordinarily skilled in the art can produce the apparatus of the present invention on the basis of the disclosure of the first embodiment.

As described above, since the presence of the first and second switches of the embodiments makes it possible to control attenuators by amounts of attenuation of the second variably attenuation controller even when no receiving signal light is input, the input level of receiving signal light can always be stabilized in a proper range.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A light transmitting and receiving module comprising:
   a light outputting section which outputs light;
   a light receiver which receives input light and which outputs an electric signal having an intensity corresponding to a light intensity of the input light;
   a first attenuator which variably attenuates the light output from the light outputting section, using a first controlling signal;
   a first attenuator controller which controls an amount of attenuation for the first attenuator through outputting the first controlling signal;
   a second attenuator which variably attenuates the input light that is to be input into the light receiver, using a second controlling signal; and
   a second attenuator controller which controls an amount of attenuation for the second attenuator through outputting the second controlling signal; wherein
   when starting-up of the light transmitting and receiving module, the first attenuator and the second attenuator are controlled and managed by
   setting an amount of attenuation of the first attenuator to be fixed;
   outputting light from the first attenuator for which an amount of attenuation is set to be fixed to the second attenuator through an alternative path different from a light transmitting path;
   at the second attenuator controller, managing a relationship between the second controlling signal for the second attenuator and an amount of attenuation for the second attenuator on the basis of the result of receiving, at the light receiver, light output from the second attenuator;

setting the amount of attenuation of the second attenuator to be fixed;

outputting light from the first attenuator, to the second attenuator for which an amount of attenuation is set to be fixed, through the alternative path different from the light transmitting path; and at the first attenuator controller, managing a relationship between the first controlling signal for the first attenuator and an amount of attenuation for the first attenuator on the basis of the result of receiving, at the light receiver, light output from the second attenuator.

2. A light transmitting and receiving apparatus comprising:

a plurality of light transmitting and receiving modules defined in claim 1, and a controller which controls the plurality of light transmitting and receiving modules such that one of the plurality of light transmitting and receiving modules functions as a working module and the remaining modules functions as protection modules.

3. A wavelength-multiplexing light transmitting and receiving apparatus comprising a plurality of light transmitting and receiving apparatus defined in claim 2 dedicated one to each wavelength of light to be transmitted and received.

4. A method for controlling and managing variable attenuation of a first attenuator and a second attenuator which are included in a light transmitting and receiving module including a light outputting section which outputs light, a light receiver which receives input light, the first variably attenuation controller which variably attenuates the light output from the light outputting section, using a first controlling signal, and the second variably attenuation controller which variably attenuates the input light that is to be input into the light receiver, using a second controlling signal, the method comprising:

when starting-up of the light transmitting and receiving module, setting an amount of attenuation of the first attenuator to be fixed;

outputting light from the first attenuator for which an amount of attenuation is set to be fixed, to the second attenuator, through an alternative path different from a light transmitting path, at a second attenuator controller which controls the second attenuator, managing a relationship between the second controlling signal for the second attenuator and an amount of attenuation for the second attenuator on the basis of the result of receiving, at the light receiver, light output from the second attenuator;

setting the amount of attenuation of the second attenuator to be fixed;

outputting light from the first attenuator, to the second attenuator for which an amount of attenuation is set to be fixed, through the alternative path different from the light transmitting path; and at a first attenuator controller which controls the first attenuator, managing a relationship between the first controlling signal for the first attenuator and an amount of attenuation for the first attenuator on the basis of the result of receiving, at the light receiver, light output from the second attenuator.

5. The method for controlling and managing according to claim 4, further comprising:

when the light transmitting and receiving module is working, outputting light that the light outputting section outputs via the first attenuator through a light transmitting path;

monitoring the light output from the light transmitting path;

at the first attenuator controller, outputting the first controlling signal based on the result of the monitoring to the first attenuator so that an amount of attenuation for the first attenuator is controlled; and at the second attenuator controller, outputting the second controlling signal based on the result of the light receiving at the light receiver to the second attenuator so that an amount of attenuation for the second attenuator is controlled.

* * * * *